US 9,141,532 B2

(12) United States Patent
Horn

(10) Patent No.: US 9,141,532 B2
(45) Date of Patent: Sep. 22, 2015

(54) DYNAMIC OVERPROVISIONING FOR DATA STORAGE SYSTEMS

(71) Applicant: Western Digital Technologies, Inc., Irvine, CA (US)

(72) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 243 days.

(21) Appl. No.: 13/727,150

(22) Filed: Dec. 26, 2012

(65) Prior Publication Data

US 2014/0181369 A1 Jun. 26, 2014

(51) Int. Cl.
*G06F 12/02* (2006.01)

(52) U.S. Cl.
CPC .................. *G06F 12/0246* (2013.01)

(58) Field of Classification Search
CPC .............................. G06F 12/02; G06F 12/0246
USPC .......... 711/103, 115, E12.001; 365/154, 184, 365/190, 200, 185.08; 716/102
See application file for complete search history.

(56) References Cited

U.S. PATENT DOCUMENTS

| 8,479,080 | B1* | 7/2013 | Shalvi et al. ................. 714/774 |
| 2005/0044332 | A1 | 2/2005 | de Brebisson |
| 2009/0228761 | A1* | 9/2009 | Perlmutter et al. ........... 714/763 |
| 2010/0161909 | A1 | 6/2010 | Nation et al. |
| 2010/0161929 | A1 | 6/2010 | Nation et al. |
| 2010/0250836 | A1* | 9/2010 | Sokolov et al. ............... 711/103 |
| 2011/0264843 | A1* | 10/2011 | Haines et al. ................. 711/103 |
| 2011/0320690 | A1 | 12/2011 | Petersen et al. |
| 2012/0210052 | A1 | 8/2012 | Norman |
| 2012/0300326 | A1* | 11/2012 | Hall ............................... 360/15 |
| 2012/0303873 | A1* | 11/2012 | Nguyen et al. ............... 711/103 |
| 2012/0303889 | A1 | 11/2012 | Coker et al. |
| 2014/0101379 | A1* | 4/2014 | Tomlin .......................... 711/103 |

FOREIGN PATENT DOCUMENTS

WO 2012-148828 A2 1/2012

OTHER PUBLICATIONS

Jakub Swacha, "Assessing the Efficiency of Data Compression and Storage System", CISIM—Computer Information Systems and Industrial Applications, Jun. 26-28, 2008, pp. 109-114.*

(Continued)

*Primary Examiner* — Cheng-Yuan Tseng
*Assistant Examiner* — Kamal K Dewan

(57) ABSTRACT

Disclosed embodiments are directed to systems and methods for dynamic overprovisioning for data storage systems. In one embodiment, a data storage system can reserve a portion of memory, such as non-volatile solid-state memory, for overprovisioning. Depending on various overprovisioning factors, recovered storage space due to compressing user data can be allocated for storing user data and/or overprovisioning. Utilizing the disclosed dynamic overprovisioning systems and methods can result is more efficient utilization of cache memory, reduction of write amplification, increase in a cache hit rate, and the like. Improved data storage system performance and increased endurance and longevity can thereby be attained.

20 Claims, 4 Drawing Sheets

(56) References Cited

OTHER PUBLICATIONS

International Search Report and Written Opinion dated Jan. 6, 2014 from PCT/US2013/061242, international filing date Sep. 23, 2013, 12 pages.

Smart Storage Systems, "The Why and How of SSD Over Provisioning," White Paper WP004, Oct. 2012, http://www.smartstoragesys.com/pdfs/WP004_OverProvisioning_WhyHow.pdf, 7 pages.

\* cited by examiner

| 200 | |
|---|---|
| 202 | Data compression rate |
| 204 | Number of failed NVM array elements |
| 206 | Read/write ratio |
| 208 | Ratio of sequential data to non-sequential data written |
| 210 | Current level of overprovisioning |
| 212 | Percentage of non-redundant data stored in NVM array |
| 214 | Wear level of NVM array |
| ... | ... |

FIGURE 2

DYNAMIC OVERPROVISIONING FOR DATA STORAGE SYSTEMS

BACKGROUND

1. Technical Field

This disclosure relates to data storage systems for computer systems. More particularly, the disclosure relates to dynamic overprovisioning for data storage systems.

2. Description of the Related Art

Data storage systems execute many system tasks and housekeeping operations, such as garbage collection, wear leveling, bad block management, and the like in the course of their normal operation. Performing system tasks and housekeeping operations involves substantial overhead, such as increased write amplification in cases when non-volatile solid-state memory is used for storing data. Accordingly, it is desirable to provide more efficient mechanisms for performing housekeeping operations.

BRIEF DESCRIPTION OF THE DRAWINGS

Systems and methods that embody the various features of the invention will now be described with reference to the following drawings, in which:

FIG. 2 illustrates overprovisioning parameters according to one embodiment of the invention.

DETAILED DESCRIPTION

Figure 1:
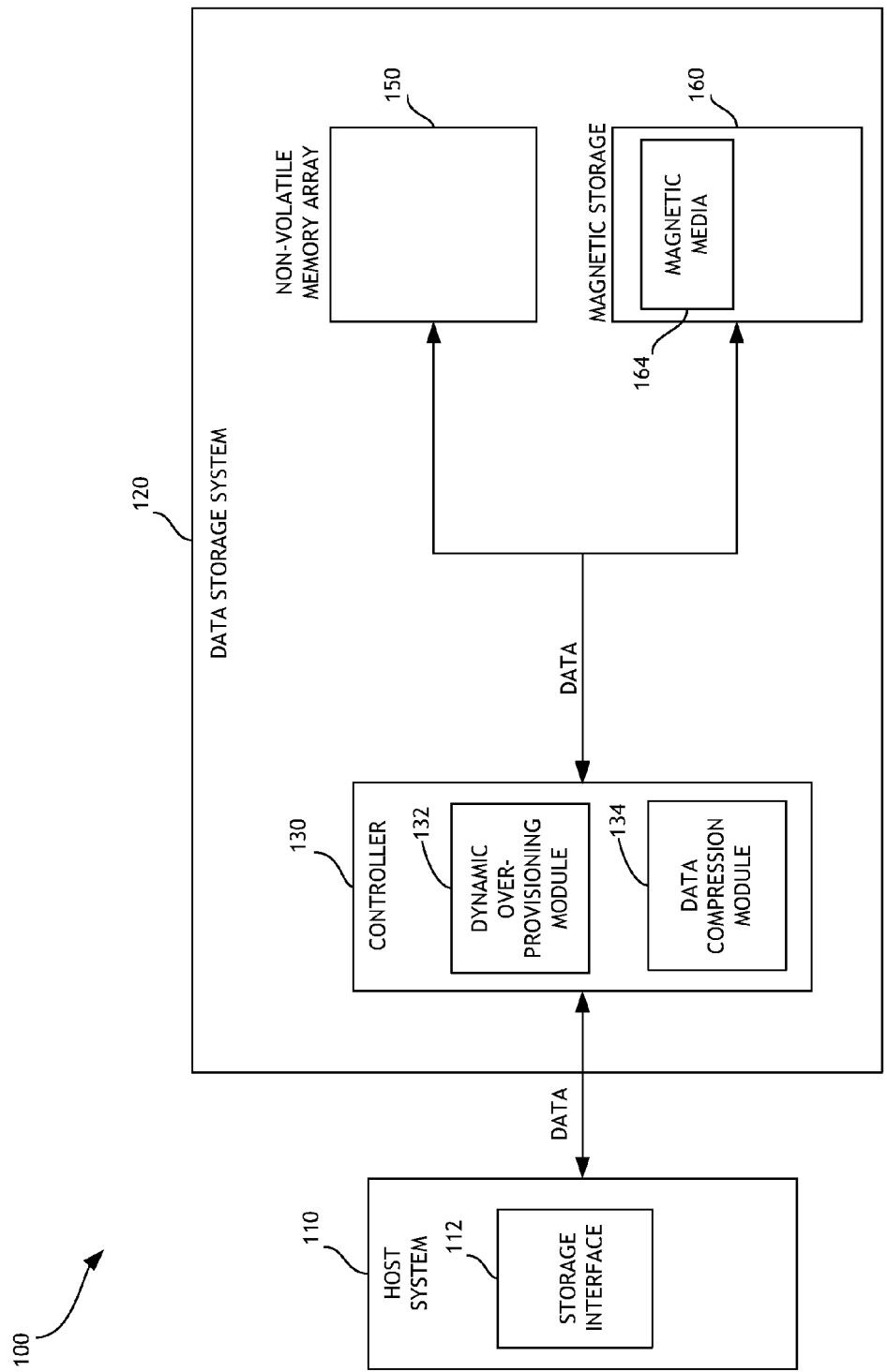
FIG. 1 illustrates a combination of a host system and a data storage system that implements dynamic overprovisioning according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems execute many housekeeping operations, such as garbage collection, wear leveling, bad block management, and the like in the course of their normal operation. Performing housekeeping operations involves substantial overhead, such as increased write amplification in cases when non-volatile solid-state memory (NVSM) is used for storing data. In certain cases, it may be advantageous to allocate additional memory to performing system tasks and/or housekeeping operations in order to improve the efficiency, longevity, and performance of a data storage system. However, allocating additional memory for system and/or housekeeping tasks is typically done at the expense of reducing a storage capacity for user data. But a data storage system typically reports a given storage capacity to a host system, and this reported storage capacity usually cannot be modified during the operation of the data storage system.

Embodiments of the present invention are directed to systems and methods for dynamic overprovisioning. A data storage system can reserve a portion of memory, such as NVSM cache memory, for overprovisioning. Overprovisioning portion can be used for efficiently performing system tasks and/or housekeeping operations. For example, overprovisioning portion can be used to reduce write amplification associated with, for example, writing data to the NVSM cache. A data storage system can recover storage capacity by compressing data stored in the NVSM cache. Depending on various overprovisioning factors, a part of or entire amount of recovered storage capacity can be allocated for overprovisioning or for storing user data. For example, when due to host system activity, the amount of user data that should be cached in the NVSM increases, a part of or entire recovered storage capacity can be utilized for storing user data. As another example, when a wear level of the NVSM exceeds a threshold, a part of entire recovered storage capacity can be utilized for overprovisioning. Such dynamic allocation of the recovered storage capacity can improve efficiency and performance.

In one embodiment, a data storage system can include a non-volatile memory array having a user data portion configured to store user data. In addition, an overprovisioning portion can be maintained. After user data has been compressed, the amount of recovered storage capacity can be determined. Based on one or more overprovisioning parameters, the data storage system can allocate the recovered storage capacity for storing user data and/or to the overprovisioning portion.

System Overview

FIG. 1 illustrates a combination 100 of a host system and a data storage system that implements priority-based garbage collection according to one embodiment of the invention. As is shown, the data storage system 120 (e.g., a hybrid disk drive) includes a controller 130 and a non-volatile memory array 150, and magnetic storage 160, which comprises magnetic media 164 (e.g., conventional or shingled). The non-volatile memory array 150 may comprise non-volatile solid-state memory (NVSM), such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The non-volatile memory array 150 can comprise one or more memory regions, such as blocks, pages, etc. Memory regions can comprise memory units. In one embodiment, the non-volatile memory array 150 can act as a cache for the magnetic storage 160. The data storage system 120 can further comprise other types of storage. In one embodiment, magnetic storage 160 can be configured as shingled magnetic storage, and the non-volatile memory array 150 is configured to be utilized as media cache for the shingled magnetic storage.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., logical block addresses or LBAs) used to access the data storage system 120. The controller 130 can execute the received commands in the non-volatile memory array 150.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where user data can be stored. Internally, the controller 130 can map logical addresses to various physical locations or addresses in the non-volatile memory array 150, magnetic storage 160, and/or other storage modules. Physical locations can be configured to store data. The controller 130 includes a dynamic overprovisioning module 132 configured to perform dynamic overprovisioning, and a data compression module 134 configured to compress data for storing in the non-volatile memory array 150 and/or magnetic storage 160.

In other embodiments, in lieu of magnetic storage 160, the data storage system 120 may include another type of data storage, such as a second non-volatile memory array. For example, the non-volatile memory array 150 may comprise a type of memory that offers faster write/read performance than the type of memory used in the second non-volatile memory array. In some embodiments, the non-volatile memory array 150 may serve as a cache to a data storage in a remote location, and synchronization of data may take place over one or more network connections.

Dynamic Overprovisioning

FIG. 2 illustrates overprovisioning parameters 200 according to one embodiment of the invention. As is illustrated, overprovisioning parameters are: a user data compression rate 202, a number of inoperative non-volatile memory array 150 locations 204, a ratio 206 of an amount of data read from the non-volatile memory array 150 to an amount of data written to the non-volatile memory array 150, a ratio 208 of an amount of consecutive data written to the non-volatile memory array 150 to an amount of non-consecutive data written to the non-volatile memory array 150, current overprovisioning level 210, a percentage 212 of non-redundant data stored in the non-volatile memory array 150, and a wear level 214 of the non-volatile memory array 150. Non-redundant data includes data that is stored in the non-volatile memory array 150 but has not been synchronized with other storage medium for which the non-volatile memory array 150 is serving as a cache, such as magnetic storage 160. Additional overprovisioning parameters can be used. Overprovisioning parameters can be generated, tracked, and/or updated by the controller 130 and/or dynamic overprovisioning module 132 and/or data compression module 134.

Figure 3:
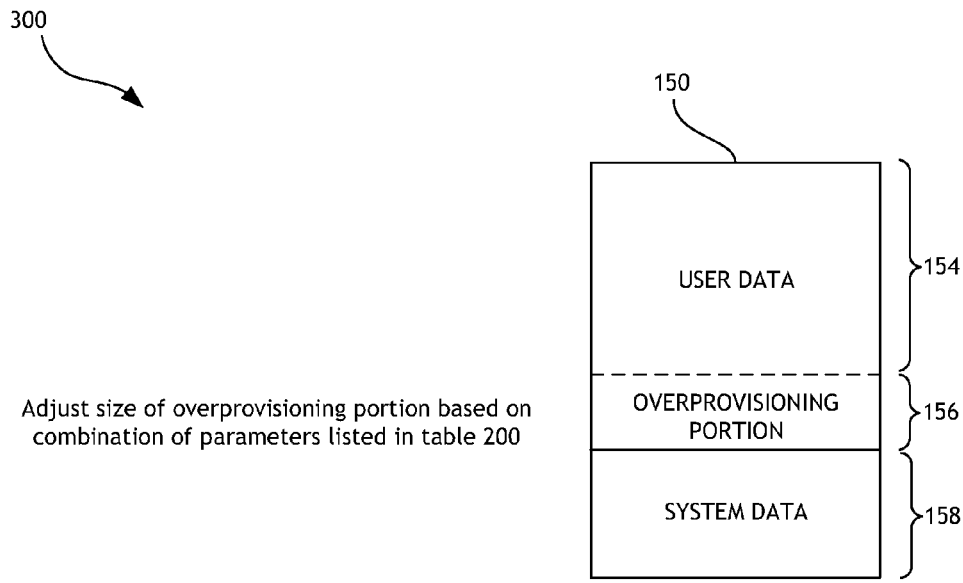
FIG. 3 illustrates dynamic overprovisioning according to one embodiment of the invention.
Figure 3:
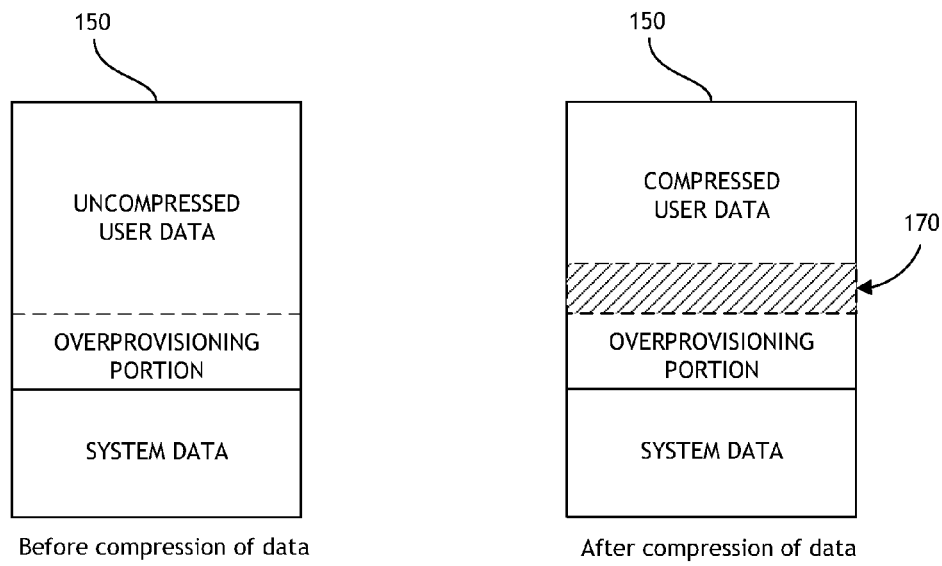

FIG. 3 illustrates dynamic overprovisioning 300 according to one embodiment of the invention. Dynamic overprovisioning 300 can be performed by the controller 130 and/or dynamic overprovisioning module 132 and/or data compression module 134. As is illustrated, the non-volatile memory array 150 can be partitioned into a user data portion 154 and system data portion 158. In addition, the memory array 150 can include an overprovisioning portion 156. The size of the overprovisioning portion 156 can be adjusted based on one or more of overprovisioning parameters, such as parameters 200 of FIG. 2. In one embodiment, the size of the overprovisioning portion can be adjusted based on a combination of the overprovisioning parameters, such as, for example, a weighted average.

As is illustrated in FIG. 3, in one embodiment, uncompressed user data is stored in the user data portion 154. When data is compressed, for example by the data compression module 134, the data storage system 120 recovers an amount of storage capacity 170. The recovered storage capacity can be allocated for storing user data and/or for overprovisioning.

Figure 4:
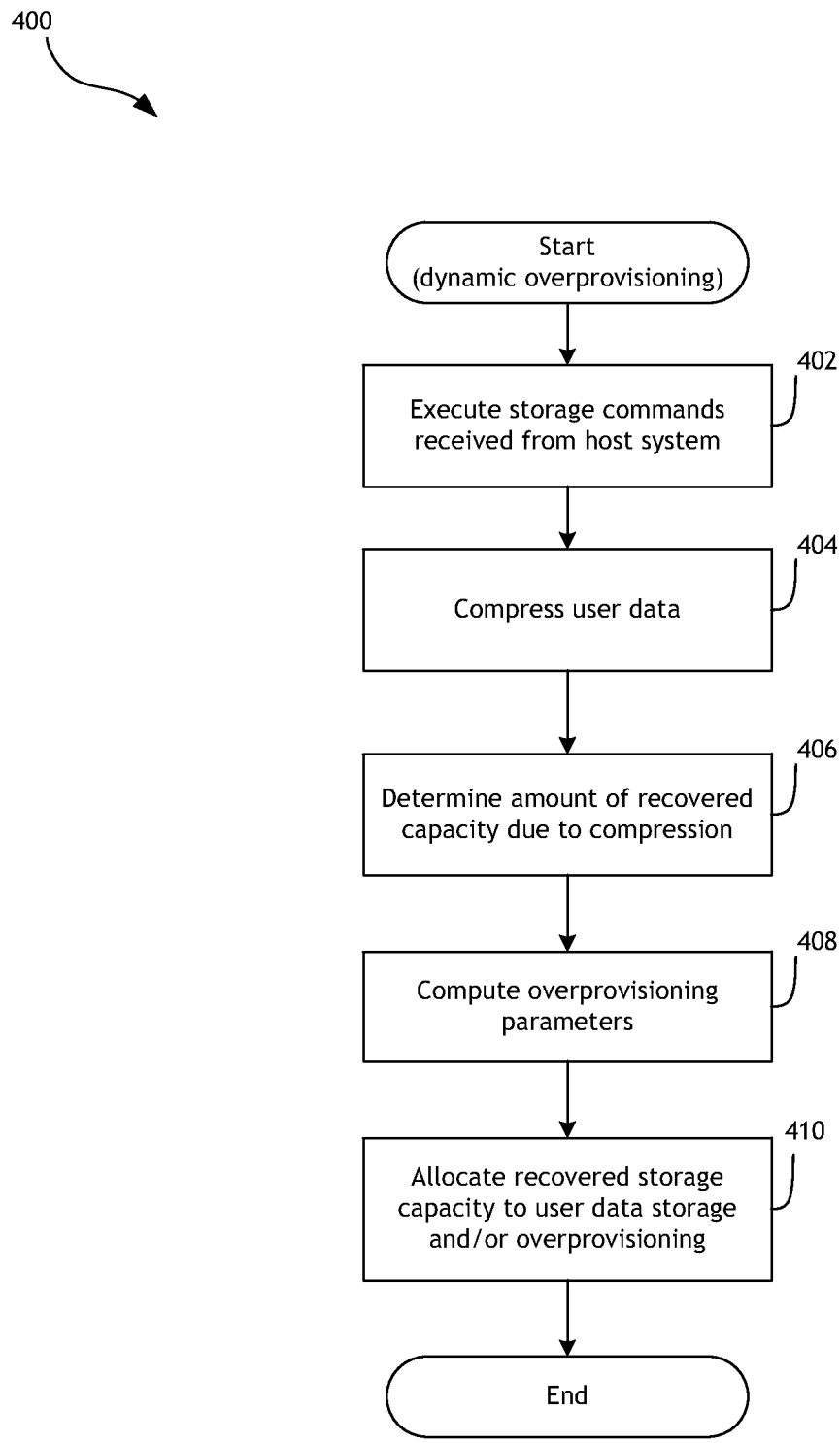
FIG. 4 illustrates a flow diagram of dynamic overprovisioning process according to one embodiment of the invention.

FIG. 4 is a flow diagram illustrating a process 400 of dynamic overprovisioning according to one embodiment of the invention. The process 400 can be executed by the controller 130 and/or the dynamic overprovisioning module 132 and/or the data compression module 134. The process 400 starts in block 402 where it executes one or more storage commands received from the host system 110. For example, the process 400 can execute a write or program command that includes user data. The process 400 transitions to block 404 where it compresses user data associated with the storage commands. Degree of compression may depend on the type of user data, and higher degree of compression may indicate that user data is compressed to a greater degree. For example, uncompressed audio and/or video data can be compressed with high degree of compression. In one embodiment, the process 400 uses lossless compression, such as Lempel-Ziv (LZ).

The process 400 transitions to block 406 where it determines the amount of recovered storage capacity due to compression of user data. In block 408, the process 400 determines and/or updates overprovisioning parameters, such as parameters 200 of FIG. 2. The process 400 transitions to block 408 where it determines how to allocate the recovered storage for user data storage and/or overprovisioning.

In one embodiment, the process 400 allocates at least some or entire portion of the recovered storage capacity for overprovisioning in response to an increase in the wear level of the non-volatile memory array 150 as compared to a wear level threshold. In such case, for example, increase in the wear level indicates that the non-volatile memory array 150 is becoming worn out, and allocating storage capacity for overprovisioning can reduce the rate of wear by decreasing write amplification. On the other hand, the process 400 allocates at least some or entire portion of the recovered storage capacity for storing user data in response to a decrease in the wear level of the non-volatile memory array 150 as compared to the wear level threshold. In such case, for example, because the non-volatile memory array 150 is not worn out, it may be desirable to allocate more storage space to user data to enhance the non-volatile memory cache hit rate.

In one embodiment, the process 400 allocates at least some or entire portion of the recovered storage capacity for storing user data in response to an increase in the number of inoperative (or failed) non-volatile memory 150 locations as compared to an inoperative locations threshold. In such case, for example, it may be advantageous to allocate the usable memory for storing user data. The process 400 also allocates at least some or entire portion of the recovered storage capacity for storing user data in response to an increase in the percentage of non-redundant data being stored in the non-volatile memory array 150 relative to a non-redundant data threshold. In such case, for example, the host system 110 may be using the non-volatile memory 150 as data cache due to, for instance, the magnetic storage 160 not be accepting data for storage (e.g., because a magnetic disk is not spinning). At least some cached user data can later be flushed to (or synchronized with), for example, the magnetic storage 160. The process 400 also allocates at least some or entire portion of the recovered storage capacity for storing user data in response to an increase in the ratio of the amount of data read from the non-volatile memory array 150 to the amount of data written to the non-volatile memory array relative to a read/write threshold. In such case, for example, the host system 110 may be performing more data retrieval operations, and performing these operations causes small or no write amplification. On the other hand, the process 400 allocates at least some or entire portion of the recovered storage capacity for overprovisioning in response to decrease in the ratio of the amount of data read from the non-volatile memory array 150 to the amount of data written to the non-volatile memory array relative to the read/write threshold. In such case, for example, the host system 110 may be performing more data program operations, which is associated with increased write amplification. Allocating more storage capacity for overprovisioning may reduce wear of the non-volatile memory array 150.

In one embodiment, the process 400 allocates at least some or entire portion of the recovered storage capacity for storing user data in response to a decrease in a data compression rate as compared to a data compression threshold. In such case, for example, user data may be less compressed and, thus, take up more space. More space can be allocated for storing user data. The process 400 also allocates at least some or entire portion of the recovered storage capacity for storing user data in response to an increase in the size of the overprovision portion as compared to an overprovisioning threshold. In such case, for example, the overprovisioning portion size may have grown too large. The process 400 also allocates at least some or entire portion of the recovered storage capacity for storing user data in response to an increase in the ratio of the amount of consecutive data written to the non-volatile memory array 150 to the amount of non-consecutive data written to the non-volatile memory array 150 as compared to a consecutive data written threshold. In such case, for example, writing consecutive or sequential data to the non-volatile memory array 150 is associated with lower write amplification than writing non-sequential data. Thus, less overprovisioning is needed to achieve a desired overall write amplification. On the other hand, the process 400 allocates at least some or entire portion of the recovered storage capacity for overprovisioning in response to a decrease in the ratio of the amount of consecutive data written to the non-volatile memory array 150 to the amount of non-consecutive data written to the non-volatile memory array 150 relative to the consecutive data written threshold. In such case, for example, more non-consecutive or random data is written, which is associated with increased write amplification. Accordingly, more storage capacity can be allocated for overprovisioning.

Conclusion

Utilizing disclosed dynamic overprovisioning systems and methods can result is more efficient use of non-volatile memory, reduction of write amplification, increase in cache hit rate, and the like. Improved data storage system performance and increased endurance can thereby be attained.

Other Variations

Those skilled in the art will appreciate that in some embodiments additional overprovisioning parameters can be used. In addition, overprovisioning parameters can be combined using any suitable linear and/or non-linear method. Further, the disclosed systems and methods can be utilized by any data storage system that is unable, due to for example limitations of a storage medium, to write random memory locations. Such data storage systems may also include cache memory. Moreover, user data can include any type data and/or combination of types of data, such as data provided by a host, data generated by a data storage system, and the like. The actual steps taken in the disclosed processes, such as the process illustrated in FIG. 4, may differ from that shown in the figure. Additional system components can be utilized, and disclosed system components can be combined or omitted. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, solid state drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
a non-volatile memory array comprising a user data portion and an overprovisioning portion, the user data portion configured to store user data;
a controller configured to dynamically adjust a capacity of the overprovisioning portion of the non-volatile memory array by:
compressing at least some user data stored in the user data portion;
determining an amount of recovered storage capacity due to the compression;
computing one or more overprovisioning parameters including a measure of an amount of non-redundant data stored in the non-volatile memory array, the non-redundant data comprising data that is not persistently stored in any memory of the data storage system other than the non-volatile memory array; and
allocating, based at least in part on the one or more overprovisioning parameters, the recovered storage capacity to at least one of a capacity of the user data portion and the capacity of the overprovisioning portion.

2. The data storage system of claim 1, wherein the controller is configured to allocate the recovered storage capacity based at least in part on a combination of two or more of the one or more overprovisioning parameters.

3. The data storage system of claim 2, wherein the controller is configured to determine a weighted average of the two or more overprovisioning parameters.

4. The data storage system of claim 1, wherein the one or more overprovisioning parameters further include at least one of:
a user data compression rate;
the capacity of the overprovisioning portion;
a wear level of the non-volatile memory array;
a number of inoperative non-volatile memory array locations;
a ratio of an amount of data read from the non-volatile memory array to an amount of data written to the non-volatile memory array; and
a ratio of an amount of consecutive data written to the non-volatile memory array to an amount of non-consecutive data written to the non-volatile memory array.

5. The data storage system of claim 4, wherein the controller is configured to allocate at least some of the recovered storage capacity to the capacity of the overprovisioning portion in response to at least one of:

an increase in the wear level of the non-volatile memory array as compared to a wear level threshold;

an increase in the ratio of the amount of data read from the non-volatile memory array to the amount of data written to the non-volatile memory array as compared to a read/write threshold; and a decrease in the ratio of the amount of consecutive data written to the non-volatile memory array to the amount of non-consecutive data written to the non-volatile memory array as compared to a consecutive data written threshold.

6. The data storage system of claim 4, wherein the controller is configured to allocate at least some of the recovered storage capacity to the capacity of the user data portion in response to at least one of:

an increase in the number of inoperative non-volatile memory locations as compared to an inoperative locations threshold;

a decrease in the user data compression rate as compared to a data compression threshold;

an increase in the capacity of the overprovisioning portion as compared to an overprovisioning threshold;

an increase in the ratio of the amount of consecutive data written to the non-volatile memory array to the amount of non-consecutive data written to the non-volatile memory array as compared to a consecutive data written threshold; and an increase in the measure as compared to a non-redundant data threshold, the measure comprising a percentage of non-redundant data stored in the non-volatile memory array.

7. The data storage system of claim 1, wherein the controller is configured to compress the at least some user data stored in the user data portion using lossless compression.

8. The data storage system of claim 1, wherein the data storage system further comprises magnetic storage, and wherein the non-volatile memory array is configured as cache memory for the magnetic storage.

9. The data storage system of claim 8, wherein the magnetic storage comprises shingled magnetic storage.

10. The data storage system of claim 1, wherein the non-volatile memory array is configured as cache memory to a remote data storage.

11. In a data storage system comprising a non-volatile memory array comprising a user data portion and an overprovisioning portion, the user data portion configured to store user data, a method of dynamically adjusting a capacity of the overprovisioning portion, the method comprising:

compressing at least some user data stored in the user data portion;

determining an amount of recovered storage capacity due to the compression;

computing one or more overprovisioning parameters including a measure of an amount of non-redundant data stored in the non-volatile memory array, the non-redundant data comprising data that is not persistently stored in any memory of the data storage system other than the non-volatile memory array; and allocating, based at least in part on the one or more overprovisioning parameters, the recovered storage capacity to at least one of a capacity of the user data portion and the capacity of the overprovisioning portion, wherein the method is performed under control of a controller.

12. The method of claim 11, wherein said allocating comprises allocating the recovered storage capacity based at least in part on a combination of each of the one or more overprovisioning parameters.

13. The method of claim 12, wherein the combination comprises a weighted average of each of the one or more overprovisioning parameters.

14. The method of claim 11, wherein the one or more overprovisioning parameters further include at least one of:

a user data compression rate;

the capacity of the overprovisioning portion;

a wear level of the non-volatile memory array;

a number of inoperative non-volatile memory array locations; and a ratio of an amount of data read from the non-volatile memory array to an amount of data written to the non-volatile memory array, a ratio of an amount of consecutive data written to the non-volatile memory array to an amount of non-consecutive data written to the non-volatile memory array.

15. The method of claim 14, wherein said allocating comprises allocating at least some of the recovered storage capacity to the capacity of the overprovisioning portion in response to at least two of:

an increase in the wear level of the non-volatile memory array as compared to a wear level threshold;

an increase in the ratio of the amount of data read from the non-volatile memory array to the amount of data written to the non-volatile memory array as compared to a read/write threshold; and a decrease in the ratio of the amount of consecutive data written to the non-volatile memory array to the amount of non-consecutive data written to the non-volatile memory array as compared to a consecutive data written threshold.

16. The method of claim 14, further comprising allocating at least some of the recovered storage capacity to the capacity of the user data portion in response to at least two of:

an increase in the number of inoperative non-volatile memory locations as compared to an inoperative locations threshold;

a decrease in the user data compression rate as compared to a data compression threshold;

an increase in the capacity of the overprovisioning portion as compared to an overprovisioning threshold;

an increase in the ratio of the amount of consecutive data written to the non-volatile memory array to the amount of non-consecutive data written to the non-volatile memory array as compared to a consecutive data written threshold; and an increase in the measure as compared to a non-redundant data threshold, the measure comprising a percentage of non-redundant data stored in the non-volatile memory array.

17. The method of claim 11, wherein said compressing the at least some user data stored in the user data portion comprises compressing using lossless compression.

18. The method of claim 11, further comprises magnetic storage, and wherein the non-volatile memory array is configured as cache memory for the magnetic storage.

19. The method of claim 18, wherein the magnetic storage comprises shingled magnetic storage module.

20. The method of claim 11, wherein the non-volatile memory array is configured as cache memory to a remote data storage.

* * * * *